United States Patent
Castro et al.

(10) Patent No.: US 8,904,480 B2
(45) Date of Patent: Dec. 2, 2014

(54) SOCIAL AUTHENTICATION OF USERS

(71) Applicant: International Business Machines Corporation, Armonk, NY (US)

(72) Inventors: Paul C. Castro, Sharon, MA (US); Umut Topkara, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 13/688,599

(22) Filed: Nov. 29, 2012

(65) Prior Publication Data

US 2014/0150071 A1    May 29, 2014

(51) Int. Cl.
*G06F 17/30*    (2006.01)
*G06F 21/31*    (2013.01)
*H04L 9/08*    (2006.01)
*H04L 12/58*    (2006.01)
*H04L 9/32*    (2006.01)
*H04N 21/258*    (2011.01)
*H04L 9/00*    (2006.01)
*H04L 29/06*    (2006.01)

(52) U.S. Cl.
CPC .............. *G06F 21/31* (2013.01); *H04L 9/0844* (2013.01); *H04L 9/0813* (2013.01); *H04L 51/32* (2013.01); *H04L 9/3226* (2013.01); *H04N 21/25816* (2013.01); *H04L 9/00* (2013.01); *H04L 12/588* (2013.01); *H04L 63/083* (2013.01)
USPC ........................ 726/2; 726/4; 726/5

(58) Field of Classification Search
CPC ....... H04L 9/00; H04L 9/0813; H04L 9/0844; H04L 9/3226; H04L 12/588; H04L 51/32; H04L 63/083; H04L 63/0861; H04N 21/25816; G06F 21/33
USPC .................................................. 726/2, 4, 5
See application file for complete search history.

(56) References Cited

U.S. PATENT DOCUMENTS

| 7,305,562 | B1 | 12/2007 | Bianco et al. | |
|---|---|---|---|---|
| 8,185,646 | B2 | 5/2012 | Headley | |
| 8,707,394 | B2 * | 4/2014 | Tam et al. | 726/3 |
| 2006/0271959 | A1 | 11/2006 | Jacoby et al. | |
| 2008/0109874 | A1 | 5/2008 | Kulkarni et al. | |
| 2008/0115192 | A1 | 5/2008 | Kulkarni et al. | |
| 2008/0209516 | A1 | 8/2008 | Nassiri | |
| 2008/0215450 | A1 | 9/2008 | Gates et al. | |
| 2009/0049298 | A1 | 2/2009 | Hatter et al. | |
| 2009/0100469 | A1 | 4/2009 | Conradt et al. | |
| 2010/0115114 | A1 | 5/2010 | Headley | |
| 2010/0274859 | A1 * | 10/2010 | Bucuk | 709/206 |
| 2011/0096174 | A1 | 4/2011 | King et al. | |
| 2012/0324543 | A1 * | 12/2012 | Tam et al. | 726/4 |
| 2013/0036459 | A1 * | 2/2013 | Liberman et al. | 726/6 |
| 2014/0150072 | A1 | 5/2014 | Castro et al. | |

OTHER PUBLICATIONS

Office action dated Jul. 18, 2014, regarding U.S. Appl. No. 13/734,509, 12 pages.

* cited by examiner

*Primary Examiner* — Krisna Lim
(74) *Attorney, Agent, or Firm* — Yee & Associates, P.C.; Anne Dougherty

(57)    ABSTRACT

User authentication is provided. A social network associated with a user of a client device is monitored to determine whether a set of designated users are currently logged in and authenticated to access a secure resource. A video connection is established between the user of the client device and the set of designated users that are currently logged in and authenticated to access the secure resource. In addition, an authentication request screen is sent showing captured video authentication data corresponding to the user of the client device to the set of designated users that are currently logged in and authenticated to access the secure resource.

12 Claims, 14 Drawing Sheets

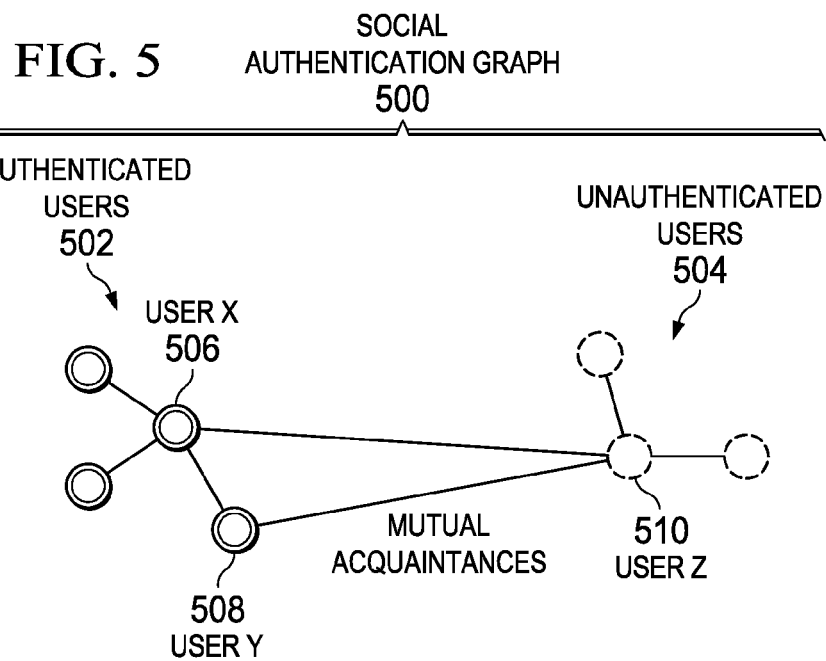
FIG. 5 — SOCIAL AUTHENTICATION GRAPH 500
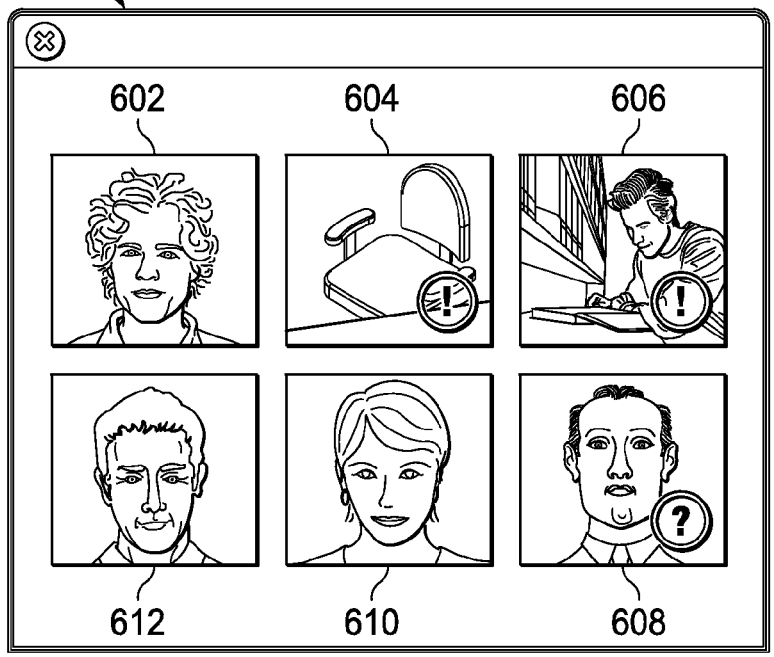
FIG. 6 — SOCIAL AUTHENTICATION NOTIFICATION SCREEN 600

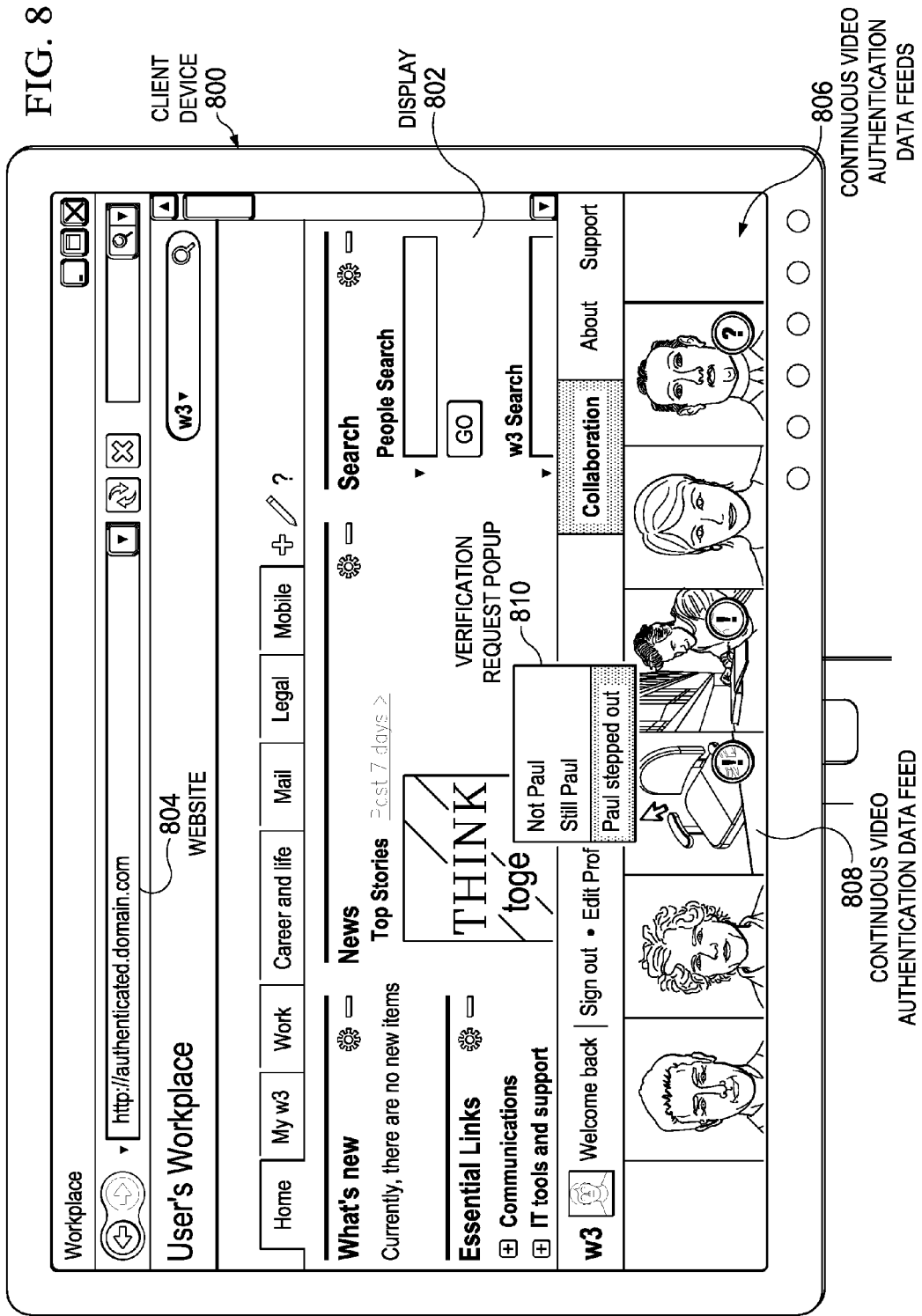

US 8,904,480 B2

SOCIAL AUTHENTICATION OF USERS

BACKGROUND

1. Field

The disclosure relates generally to user authentication and more specifically to authenticating a user of a client device to access a secure resource using video authentication data corresponding to the user that is viewed by a set of one or more designated users, which already have been authenticated to access the secure resource.

2. Description of the Related Art

User authentication is a critical component in the security of any data processing system. Authenticating a user's identity is a first step in providing access control to secure resources associated with a data processing system. Typically, authentication processes rely on username and password combinations to authenticate a user. While this username/password authentication technology is not foolproof, it has been serviceable as an authentication method for decades.

SUMMARY

According to one illustrative embodiment, a method for user authentication is provided. A data processing system monitors a social network associated with a user of a client device to determine whether a set of designated users are currently logged in and authenticated to access a secure resource. The data processing system establishes a video connection between the user of the client device and the set of designated users that are currently logged in and authenticated to access the secure resource. In addition, the data processing system sends an authentication request screen showing captured video authentication data corresponding to the user of the client device to the set of designated users that are currently logged in and authenticated to access the secure resource.

BRIEF DESCRIPTION OF THE SEVERAL VIEWS OF THE DRAWINGS

FIG. 5 is a diagram illustrating an example of a social authentication graph in accordance with an illustrative embodiment;

FIG. 6 is a diagram illustrating an example of a social authentication screen in accordance with an illustrative embodiment;

FIG. 8 is a diagram illustrating an example of a continuous video authentication data feed in accordance with an illustrative embodiment;

DETAILED DESCRIPTION

Figure 1:
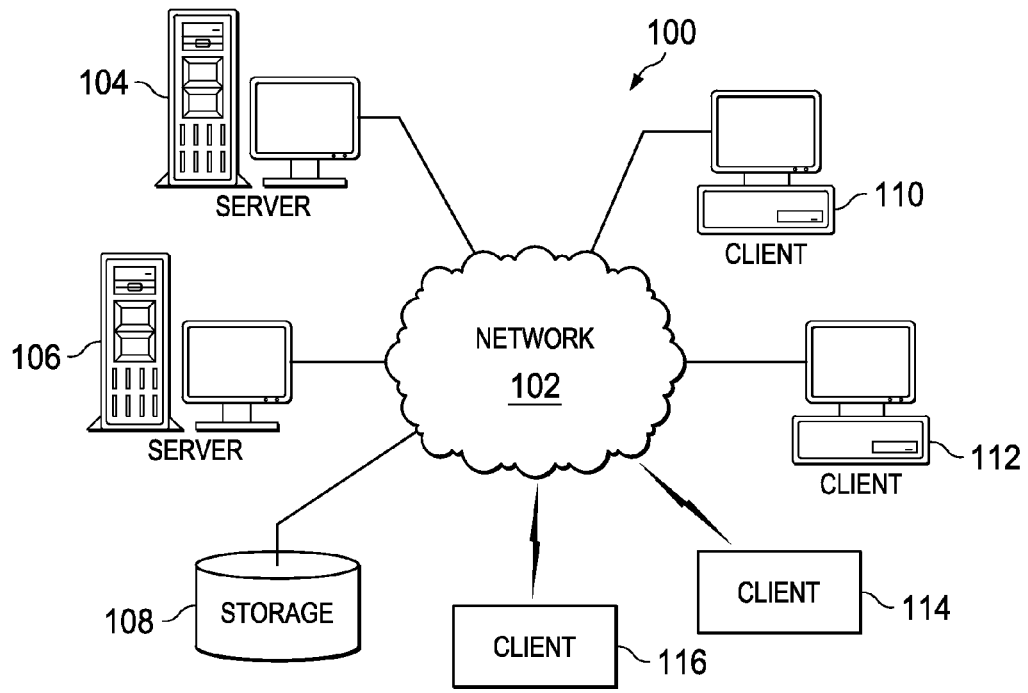
FIG. 1 is a pictorial representation of a network of data processing systems in which illustrative embodiments may be implemented.

As will be appreciated by one skilled in the art, aspects of the illustrative embodiments may be embodied as a data processing system, method, or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, data processing systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
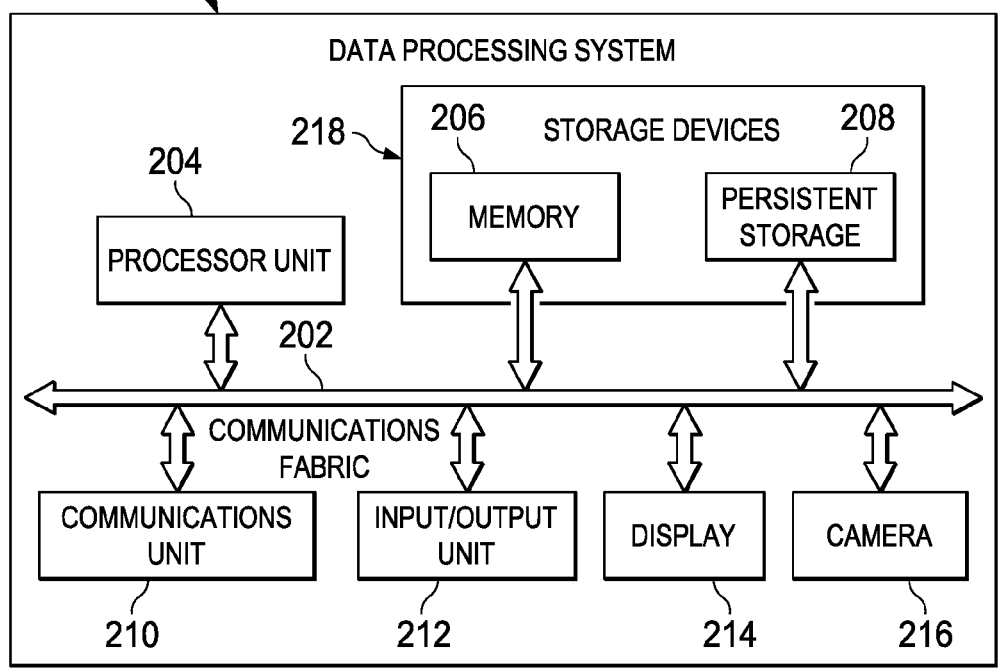
FIG. 2 is a diagram of a data processing system in which illustrative embodiments may be implemented.
Figure 3:
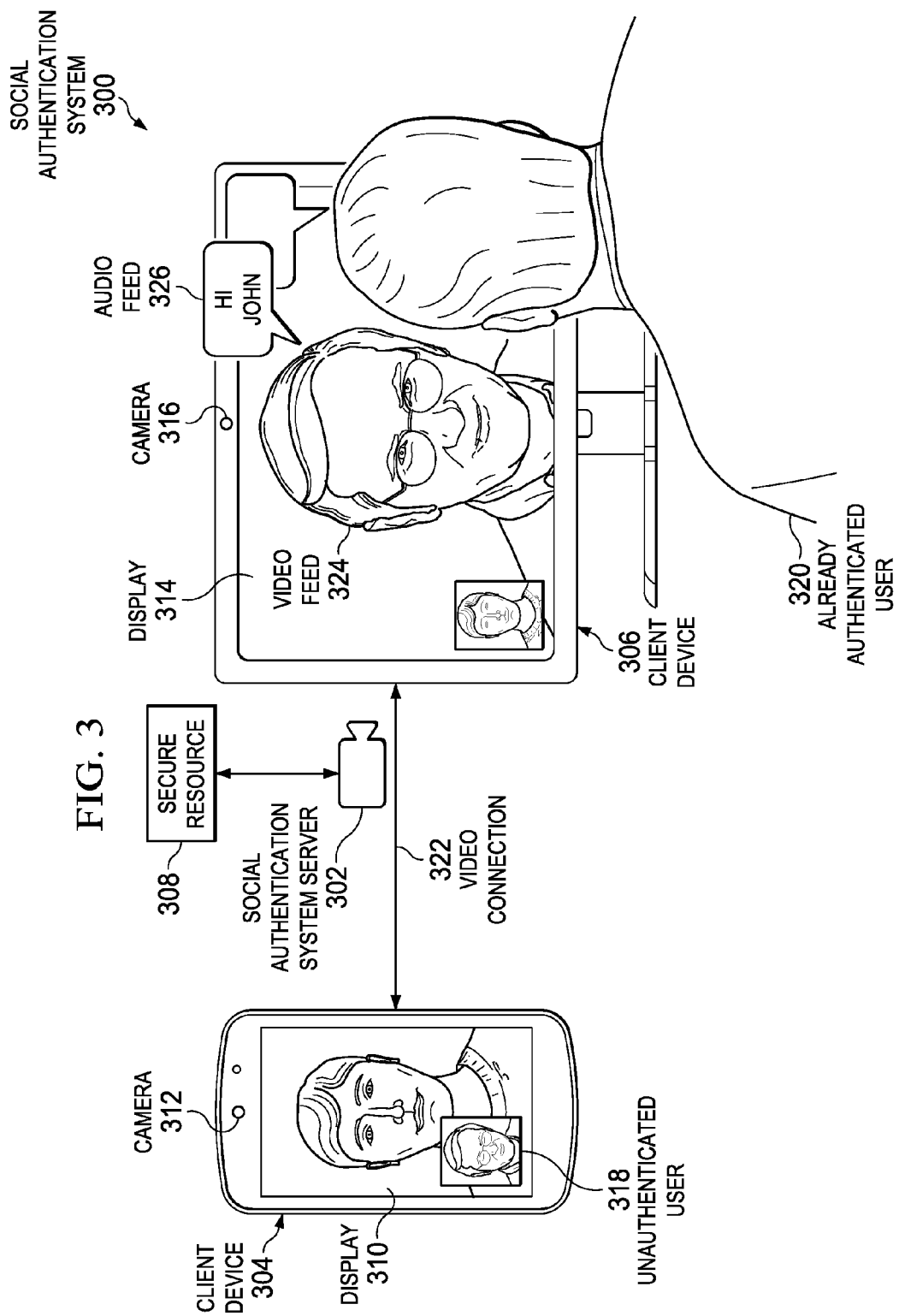
FIG. 3 is a diagram illustrating an example of a social authentication system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire communication links, wireless communication links, or fiber optic cables.

In the depicted example, server 104 and server 106 connect to network 102, along with storage unit 108. Server 104 and server 106 may be, for example, server computers with high speed connections to network 102. In addition, server 104 and/or server 106 may provide services for authenticating users of client devices connected to network 102 by showing video authentication data of unauthenticated users to designated users, which already have been authenticated to access secure resources, prior to the unauthenticated users accessing the secure resources in network data processing system 100.

A secure resource may be, for example, a network, a document, a software application, a video conferencing system, or a hardware component in network data processing system 100 that has restricted access by only authenticated users.

Clients 110, 112, 114, and 116 also connect to network 102. Clients 110, 112, 114, and 116 are clients to server 104 and/or server 106. In the depicted example, server 104 and/or server 106 may provide information, such as boot files, operating system images, and applications to clients 110, 112, 114, and 116.

Clients 110 and 112 may be, for example, client computers, such as personal computers, network computers, or portable computers, such as laptop computers, with wire communication links to network 102. Clients 114 and 116 may be, for example, mobile data processing systems, such as cellular telephones, smart phones, personal digital assistants, gaming devices, or handheld computers, with wireless communication links to network 102. However, it should be noted that clients 110, 112, 114, and 116 may represent any combination of computers and mobile data processing systems connected to network 102.

Storage unit 108 is a network storage device capable of storing data in a structured or unstructured format. Storage unit 108 may provide, for example, storage of: names and identification numbers of a plurality of users; user profiles corresponding to the plurality of users that may include contact information for the plurality of users, such as telephone numbers, internet protocol addresses, media access control addresses, and the like; user history data for each of the users in the plurality of users that may include listings of previously accessed secure resources and recordings of video authentication data corresponding to each of the users when the users previously accessed the secure resources; lists of designated users for each user in the plurality of users that are designated to authenticate the users to access secure resources; and network addresses, such as uniform resource locators (URLs), of social media web sites and business networks associated with each user in the plurality of users. The contacts within the social media web sites and business networks associated with each user may comprise at least a portion of a user's social network. Furthermore, storage unit 108 may store other data, such as authentication data that may include user names, passwords, and/or biometric data associated with the plurality of users of the social authentication service.

Moreover, it should be noted that network data processing system 100 may include any number of additional server devices, client devices, and other devices not shown. Program code located in network data processing system 100 may be stored on a computer recordable storage medium and downloaded to a computer or other device for use. For example, program code may be stored on a computer recordable storage medium on server 106 and downloaded to client 114 over network 102 for use on client 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, display 214, and display 216.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a non-statutory propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other data processing systems or devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200. In addition, communications unit 210 is capable of establishing and maintaining video conferencing connections with other data processing systems or devices.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user. In addition, display 214 may provide touch screen capabilities.

Camera 216 is an example of an imaging device that is capable of taking still photographs and/or video clips. The video clips may include image data and audio data. The audio data may be obtained by a microphone of data processing system 200, which may be a part of input/output unit 212. Data processing system 200 may utilize camera 216 to capture video authentication data of a user of data processing system 200 when establishing and maintaining video conferencing connections with the other data processing systems. Users of the other data processing systems may use the captured video authentication data of the user of data processing system 200 to verify and authenticate that the user of data processing system 200 actually is the person they know the user of data processing system 200 to be.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200. In some instances, computer readable storage media 226 may not be removable from data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 220 may be downloaded over a network to persistent storage 208 from another device or data processing system through computer readable signal media 228 for use within data processing system 200. For instance, program code stored in a computer readable storage media in a server data processing system may be downloaded over a network from the server to data processing system 200. The data processing system providing program code 220 may be a server computer, a client computer, or some other device capable of storing and transmitting program code 220.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 226 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that authentication is a weak spot in the usability of data processing systems and is viewed as a burden by many users. Problems in authentication tend to translate into security problems according to research literature, and especially password authentication has been shown to be a source of many security vulnerabilities. Despite the evidence showing the shortcomings of password authentication, data processing system users are still forced to enter text passwords into their data processing systems to unlock secure resources.

Authentication in real life usually is accomplished through human interaction. This real life authentication may include social gestures, such as a greeting, a handshake, or a nod, and involves facial recognition and/or voice recognition. Illustrative embodiments perform social authentication of a user, not only by using social network information associated with the user, but also by using a social human-to-human interaction. Illustrative embodiments allow users to authenticate other users through video conferencing connections or telephone connections, when it is less convenient to authenticate by other authentication means or when resource access control policies require authentication to be provided by other users. In addition, illustrative embodiments also support continuous authentication of a user by keeping the video conferencing connection open until the user locks the accessed resource or logs out.

Illustrative embodiments may store a list or graph of mutual acquaintance pairs associated with the users. For example, if a mutual acquaintance table entry (x,y) exists for users x and y, then illustrative embodiments are able to determine that users x and y know each other and that users x and y are able to verify and authenticate the identity of each other. Given a network of data processing systems with an authentication mechanism and a set of users, then at any given time a subset of the set of users may be currently authenticated to access and use a set of one or more secure resources.

As an example, user X may request access to a secure resource. As a result, illustrative embodiments determine a set of one or more mutual acquaintances of user X using a mutual acquaintance table or graph. Subsequent to determining the set of mutual acquaintances of user X, illustrative embodiments may request that the set of mutual acquaintances of user X authenticate the identity of user X. User Y, for example, of the set of mutual acquaintances of user X may respond to the request for authentication. Illustrative embodiments may then establish a video conference connection between user X and user Y. After illustrative embodiments establish the video conference connection between user X and user Y, user Y after seeing and communicating with user X may provide, for example, an input to illustrative embodiments indicating that user X actually is user X. Consequently, illustrative embodiments will grant user X, now socially authenticated by user Y, access to the requested secure resource. If, however, user Y indicates that user X is not the person user Y knows user X to be, illustrative embodiments will deny user X access to the requested secure resource.

Furthermore, after user Y socially authenticates user X, illustrative embodiments may broadcast a continuous video authentication data feed to all acquaintances in the set of mutual acquaintances of user X. In addition, illustrative embodiments may provide all the acquaintances with an interface to view continuous video authentication data feeds of other acquaintances. Thus, each user may monitor continuous video authentication data feeds of other users.

If, for example, user X is not visible in user X's continuous video authentication data feed after initial authentication by user Y, then an observant acquaintance may indicate to illustrative embodiments that user X is not present in the feed. Consequently, illustrative embodiments may temporarily lock the secure resource until user X reappears in the continuous video authentication data feed. Alternatively, illustrative embodiments may utilize facial recognition technology to determine whether user X's face is detected in user X's continuous video authentication data feed. After determining that user X's face is not detected in user X's continuous video authentication data feed, illustrative embodiments may send a verification request to the set of acquaintances of user X requesting verification of user X's presence in the continuous authentication data feed.

If, for example, someone other than user X is present in user X's continuous video authentication data feed, then an observant acquaintance may indicate to illustrative embodiments that user X is not present in the feed. As a result, illustrative embodiments may close access to the secure resource and log off user X's account in order to protect illustrative embodiments from a possible security breach. Illustrative embodiments do not simply allow for the replacement of password authentication, but also allow for the adhoc creation of group-accessed resources for which a subset of all the users are allowed to perform certain actions, such as read or write.

Further, illustrative embodiments may determine an acquaintance or social network of user X by searching, for example, a set of one or more social media web sites and/or a set of one or more business networks associated with user X. The social media web sites may contain, for example, lists of friends and family of user X. The business networks may contain, for example, organizational charts or directories listing co-workers of user X and the relationship of those co-workers to user X. Then, illustrative embodiments may generate a graph of the social network of user X such that each person is a node in the graph and a link exists between two nodes if the two people associated with those nodes know each other personally.

If, for example, no people in user X's social network are currently authenticated to access the secure resource that user X is requesting access to, then illustrative embodiments may prompt user X to input authentication data, such as, for example, a username/password combination and/or biometric data, associated with user X. However, if one or more people in user X's social network are currently authenticated to access the secure resource that user X is requesting access to, then illustrative embodiments may provide user X with an option to be authenticated by one or more of the people in user X's social network that are currently authenticated to access the secure resource via a video connection.

Furthermore, illustrative embodiments may take into account the role of each person included in user X's social network graph in the authentication process. For example, illustrative embodiments may utilize defined policies that only permit certain people to authenticate user X to access the secure resource. Also, the policies may define a set of one or more actions that user X may take while accessing the secure resource based on the role of the person that authenticated user X. Moreover, illustrative embodiments may record the video authentication process for security auditing purposes.

Thus, illustrative embodiments provide a method for user authentication. A data processing system monitors a social network associated with a user of a client device to determine whether a set of designated users are currently logged in and authenticated to access a secure resource. The data processing system establishes a video connection between the user of the client device and the set of designated users that are currently logged in and authenticated to access the secure resource. In addition, the data processing system sends an authentication request screen showing captured video authentication data corresponding to the user of the client device to the set of designated users that are currently logged in and authenticated to access the secure resource.

With reference now to FIG. 3, a diagram illustrating an example of a social authentication system is depicted in accordance with an illustrative embodiment. Social authentication system 300 may be, for example, implemented in a network of data processing systems, such as network data processing system 100 in FIG. 1. A user may utilize social authentication system 300 to be authenticated by another user of social authentication system 300 via a video connection.

Social authentication system 300 includes social authentication system server 302, client device 304, client device 306, and secure resource 308. However, it should be noted that social authentication system 300 is intended as an example and not intended as a limitation on illustrative embodiments. In other words, social authentication system 300 may include any number of servers, clients, and secure resources.

Social authentication system server 302 may be, for example, server 104 in FIG. 1. Client devices 304 and 306 may be, for example, clients 110 and 116 in FIG. 1. Client device 304 includes display 310 and camera 312, such as display 214 and camera 216 in FIG. 2. Similarly, client device 306 includes display 314 and camera 316. Secure resource 308 may be, for example, a network, a document, a software application, a video conferencing system, or a hardware component in network data processing system 100 that has restricted access by only authenticated users.

In this example, unauthorized user 318 of client device 304 requests access to secure resource 308. As a result, social authentication system server 302 determines a set of users in unauthenticated user 318's social network that are currently authenticated to access secure resource 308. Also in this example, social authentication system server 302 determines that already authenticated user 320 of client device 306 is in unauthenticated user 318's social network and is currently authenticated to access secure resource 308. Consequently, social authentication system server 302 establishes video connection 322 between client device 304 and client device 306. Already authenticated user 320 may have been previously authenticated to access secure resource 308 by submitting a valid username/password combination to social authentication system server 302. Alternatively, already authenticated user 320 may have been previously authenticated to access secure resource 308 socially by another already authenticated user.

Video connection 322 includes video feed 324 and audio feed 326. Video feed 324 includes images of unauthenticated user 318 of client device 304. Audio feed 326 includes the voice of unauthenticated user 318. Thus, already authenticated user 320, by viewing images of unauthenticated user 318 in video feed 324 and listening to the voice of unauthenticated user 318 in audio feed 326, now has the ability to socially authenticate unauthenticated user 318.

Already authenticated user 320 may socially authenticate unauthenticated user 318 by sending an indication to social authentication system server 302 that unauthenticated user 318 is who unauthenticated user 318 claims to be. After receiving authentication of unauthenticated user 318 by already authenticated user 320, social authentication system server 302 grants the requested access to secure resource 308. If, however, already authenticated user 320 sends an indication to social authentication system server 302 that unauthenticated user 318 is not who unauthenticated user 318 claims to be, then social authentication system server 302 denies the requested access to secure resource 308.

Figure 4:
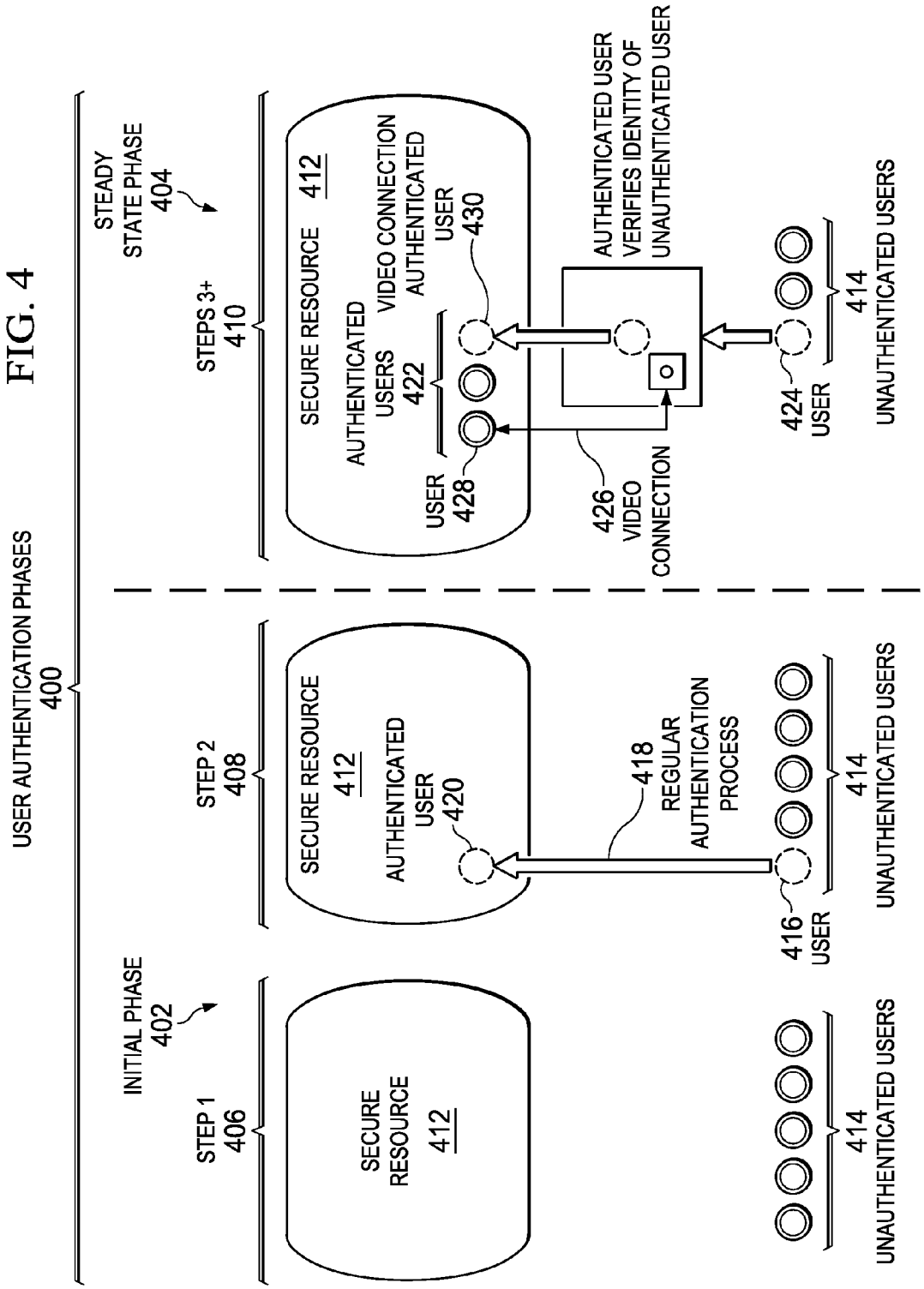
FIG. 4 is a diagram illustrating example phases for authenticating users in a social authentication process in accordance with an illustrative embodiment.

With reference now to FIG. 4, a diagram illustrating example phases for authenticating users in a social authentication process is depicted in accordance with an illustrative embodiment. User authentication phases 400 are different phases of user authentication in a social authentication system, such as social authentication system 300 in FIG. 3. User authentication phases 400 include initial phase 402 and steady state phase 404.

Initial phase 402 is an authentication phase that occurs initially when no other users of the social authentication system are currently authenticated to access a secure resource, such as secure resource 412. Secure resource 412 may be, for example, secure resource 308 in FIG. 3. Initial phase 402 includes step 1 406 and step 2 408. At step 1 406, the process starts with unauthenticated users 414, such as unauthenticated user 318 in FIG. 3. At step 2 408, user 416 in unauthenticated users 414 requests to access secure resource 412. The social authentication system authenticates user 416 using regular authentication process 418. Regular authentication process 418 may be, for example, user 416 submitting a valid user name and password to the social authentication system. After the social authentication system authenticates user 418 using regular authentication process 418, user 416 becomes authenticated user 420.

Steady state phase 404 is an authentication phase that occurs when one or more users of the social authentication system are currently authenticated to access secure resource 412, such as authenticated users 422. Authenticated users 422 may be, for example, already authenticated user 320 in FIG. 3 or authenticated user 420. Steady state phase 404 includes step 3 plus 410. Step 3 plus means that the social authentication system may perform this authentication step any number of times as long as at least one user remains in authenticated users 422 when an unauthenticated user in unauthenticated users 414 requests access to secure resource 412.

In this example, user 424 in unauthenticated users 414 requests access to secure resource 412. Consequently, the social authentication system establishes video connection 426, such as video connection 322 in FIG. 3, between user 424 and user 428 in authenticated users 422. Authenticated user 428 verifies the identity of unauthenticated user 424 via video connection 426. Consequently, unauthenticated user 424 becomes video connection authenticated user 430.

With reference now to FIG. 5, a diagram illustrating an example of a social authentication graph is depicted in accordance with an illustrative embodiment. Social authentication graph 500 illustrates social relationships between authenticated users 502 and unauthenticated users 504. Authenticated users 502 may be, for example, authenticated users 422 in FIG. 4 or already authenticated user 320 in FIG. 3. Unauthenticated users 504 may be, for example, unauthenticated users 414 in FIG. 4 or unauthenticated user 318 in FIG. 3.

A social authentication system, such as social authentication system 300 in FIG. 3, may determine mutual acquaintances between users by searching, for example, social media web sites and/or business networks associated with the users. Then, the social authentication system may generate social authentication graph 500 such that each user is a node in social authentication graph 500. In addition, the social authentication system generates a link between two nodes if the social authentication system determines that the two users represented by those nodes know each other personally. Alternatively, the social authentication system may generate social authentication graph 500 from lists of designated users created by each of the users of the social authentication system. A designated user is a person that a user has identified as personally knowing the user and the user has authorized that person to socially authenticate the user via a video connection, such as video connection 426 in FIG. 4 or video connection 322 in FIG. 3.

In this example, user X 506 and user Y 508 of authenticated users 502 are mutual acquaintances of and personally know user Z 510 of unauthenticated users 504. Using social authentication graph 500, the social authentication system is able to determine that user X 506 and user Y 508 personally know user Z 510 and, therefore, user X 506 and user Y 508 would be able to socially authenticate user Z 510 via a video connection. As a result, when user Z 510 requests to access a secure resource, such as secure resource 412 in FIG. 4, the social authentication system will establish a video connection between user Z 510 and user X 506 and/or user Y 508 to verify user Z 510's identity and to authenticate user Z 510 to access the secure resource.

With reference now to FIG. 6, a diagram illustrating an example of a social authentication screen is depicted in accordance with an illustrative embodiment. Social authentication screen 600 is a specific example of a screen shot that illustrative embodiments may utilize for social authentication of users. Social authentication screen 600 may be implemented in a display, such as display 314 in FIG. 3.

In this example, social authentication screen 600 includes six different video authentication data feeds 602-612. However, it should be noted that illustrative embodiments may include more or fewer video authentication data feeds in social authentication screen 600. Also in this example, video authentication data feeds 602, 610, and 612 show video authentication data corresponding to three different users of a social authentication system, such as social authentication system 300 in FIG. 3. It should be noted that the video authentication data corresponding to the different users includes facial images of each of the respective users.

Video authentication data 604 shows an empty chair with an encircled exclamation mark. Video authentication data 604 represents a user that has moved away from an image capturing area associated with a camera of a data processing system, such as camera 316 of client device 306 in FIG. 3. The encircled exclamation mark within video authentication data 604 is to alert other users of the social authentication system that the user corresponding to video authentication data 604 is no longer detected and to prompt the other users to verify that the user corresponding to video authentication data 604 is no longer present. As a result, the social authentication system may temporarily lock the secure resource that the user corresponding to video authentication data 604 was accessing until the user returns.

Video authentication data 606 shows a side view of a user with an encircled exclamation mark. Because a facial image is not present within video authentication data 606, the social authentication system alerts the other users to verify the identity of the user corresponding to video authentication data 606. Video authentication data 608 shows a facial image of a user with an encircled question mark. Even though a facial image is present within video authentication data 608, the social authentication system is requesting that the other users verify the identity of the user corresponding to video authentication data 608. For example, the social authentication system using facial recognition technology may have determined that the facial image now appearing within video authentication data 608 is not the same facial image that was present upon initial authentication of the user (i.e., a different person is now appearing within video authentication data 608). Consequently, the social authentication system prompts the other users to verify the identity of the user corresponding to video authentication data 608 by displaying the encircled question mark.

Figure 7:
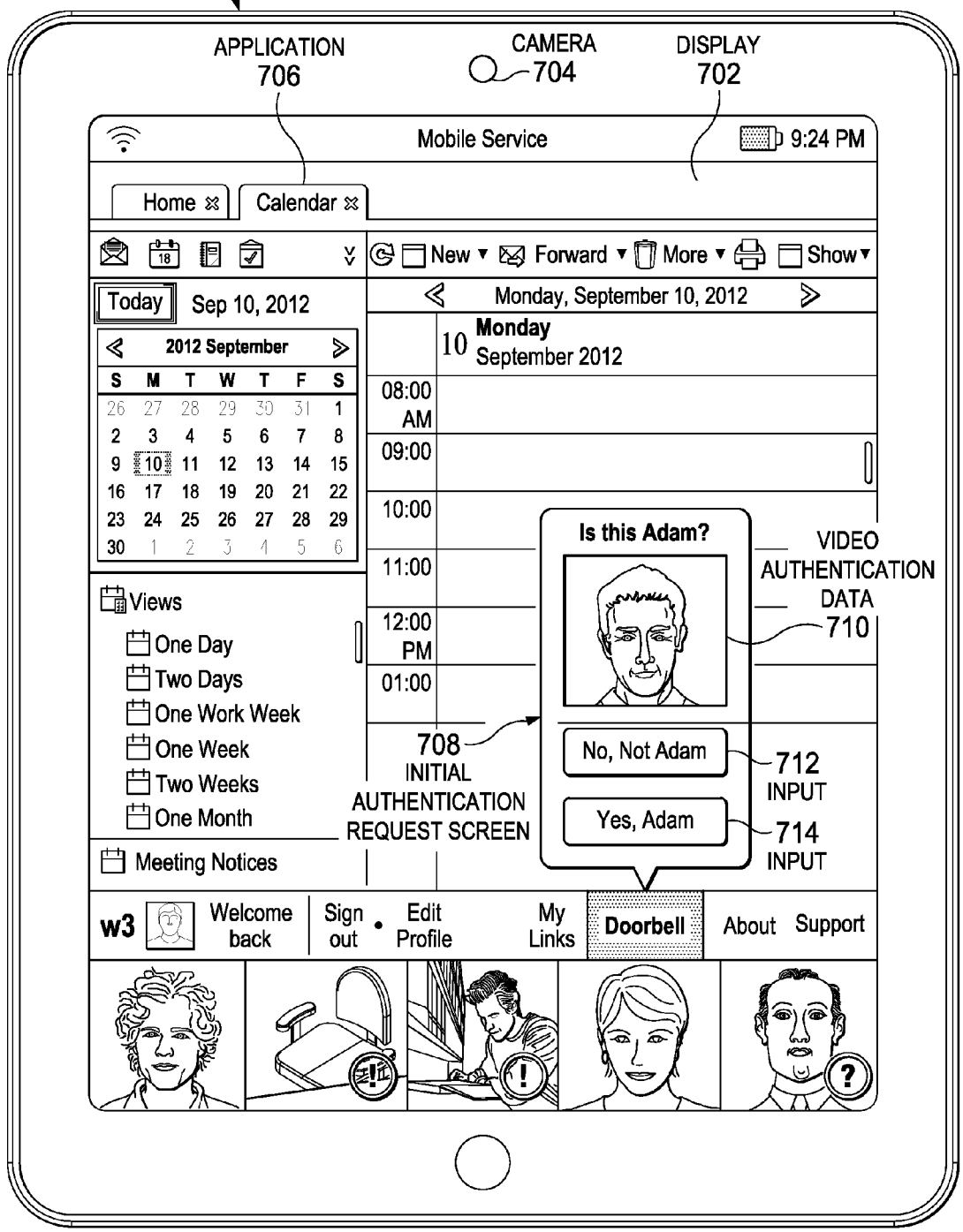
FIG. 7 is a diagram illustrating an example of an initial authentication request screen in accordance with an illustrative embodiment.
Figure 10A:
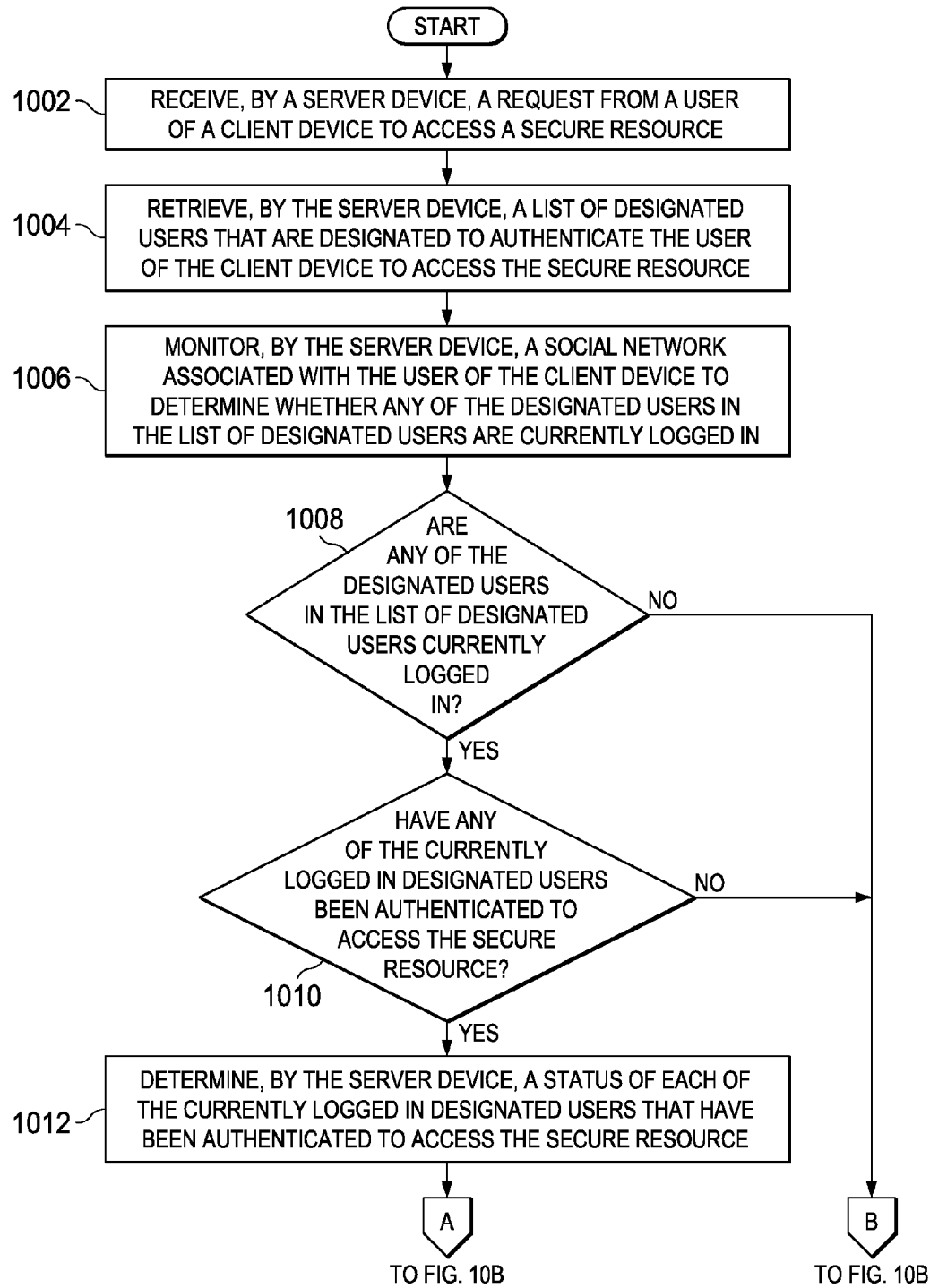
FIGS. 10A-10F are a flowchart illustrating a process for user authentication in accordance with an illustrative embodiment.
Figure 10B:
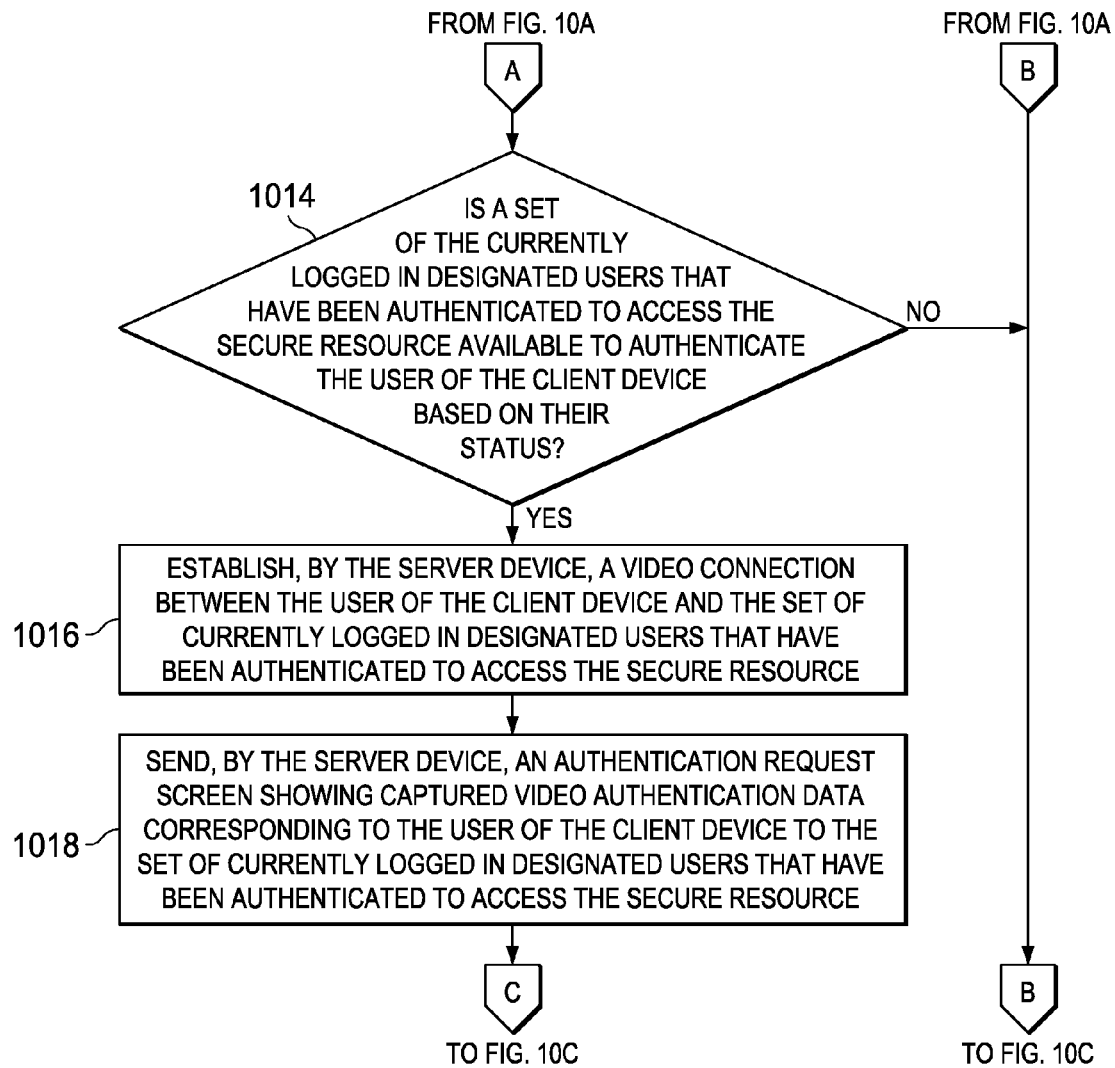
Figure 10C:
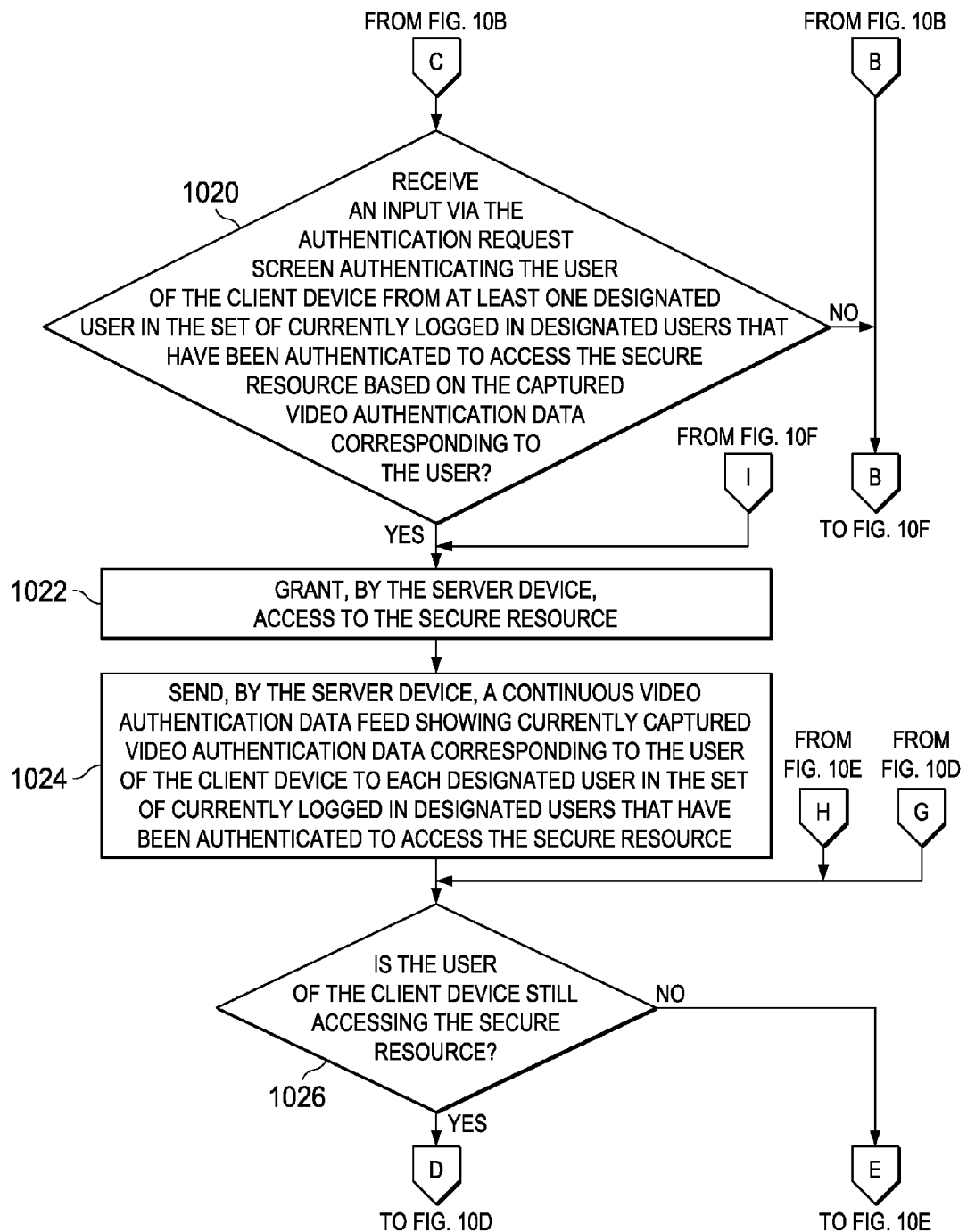
Figure 10D:
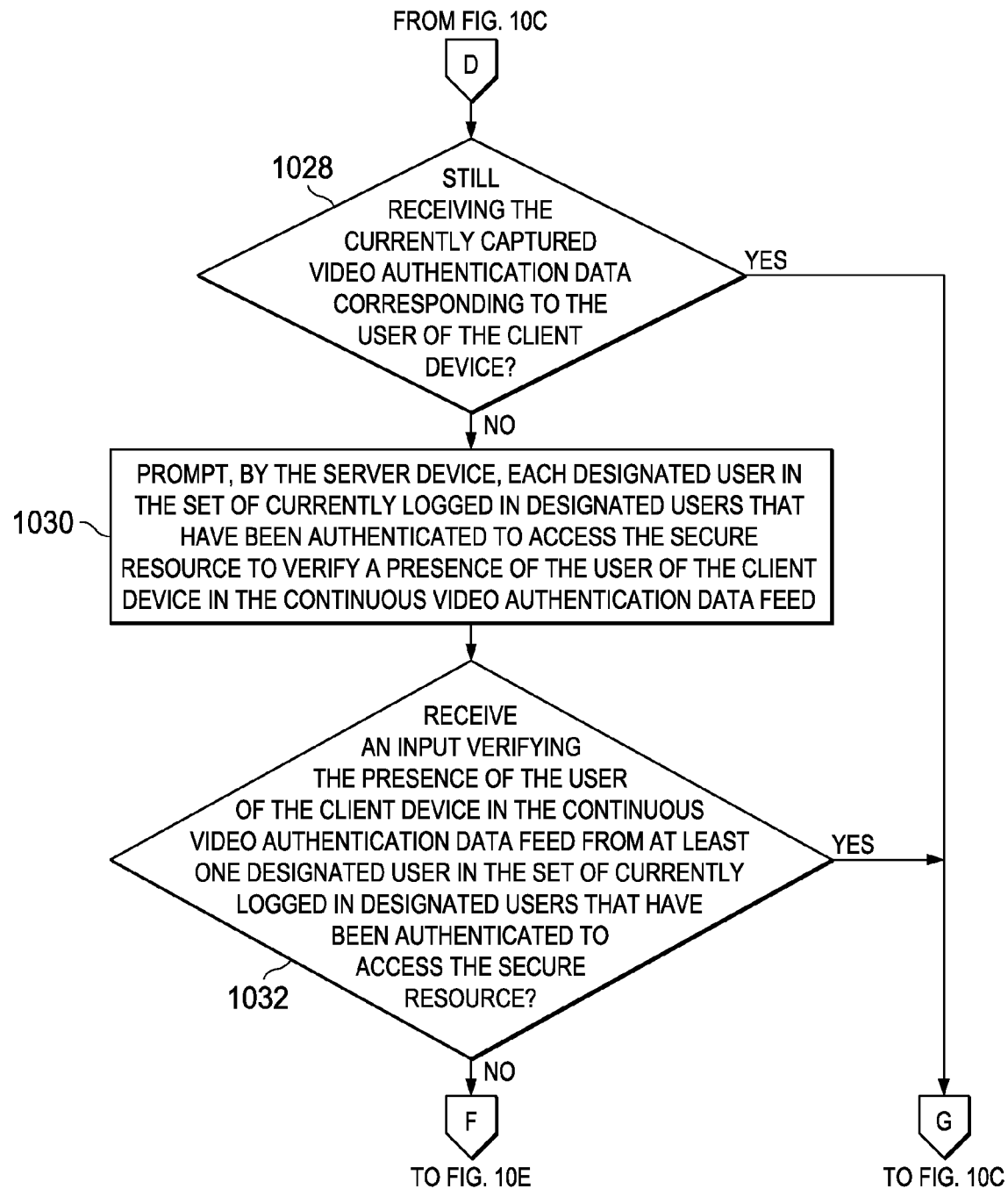
Figure 10E:
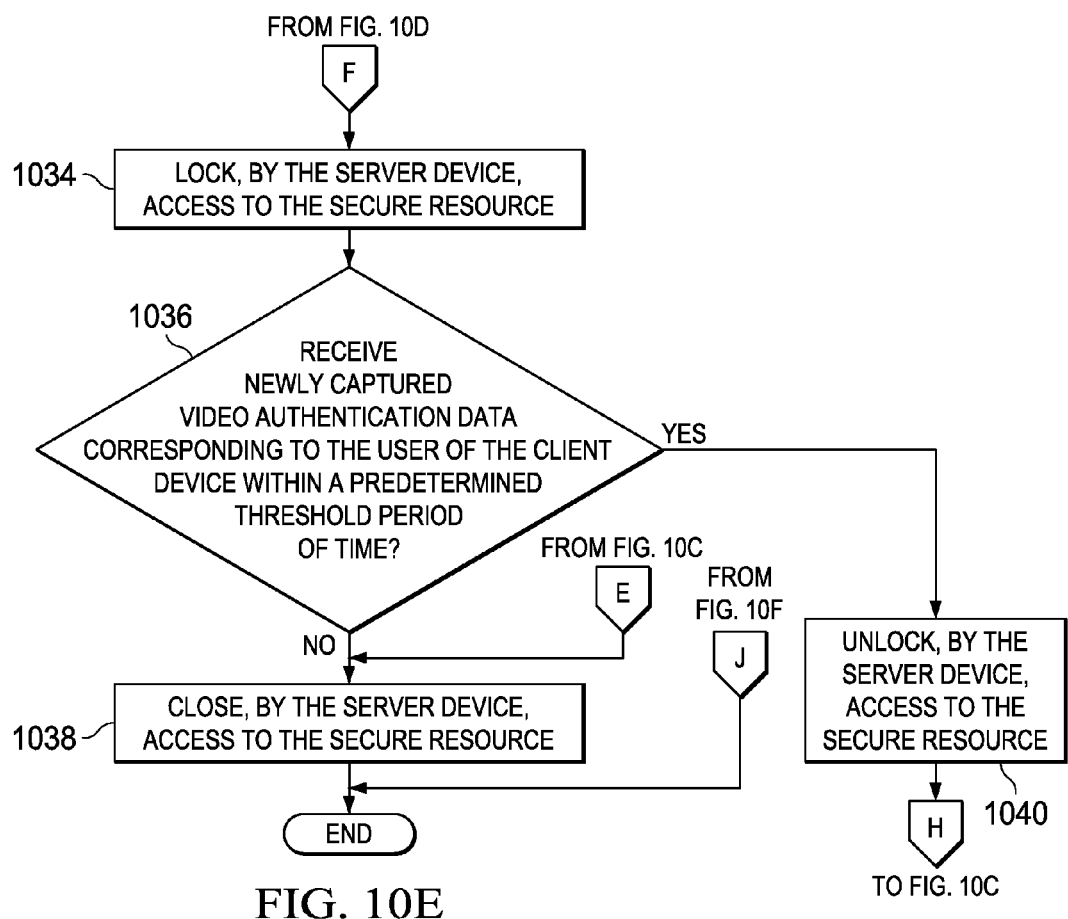
Figure 10F:
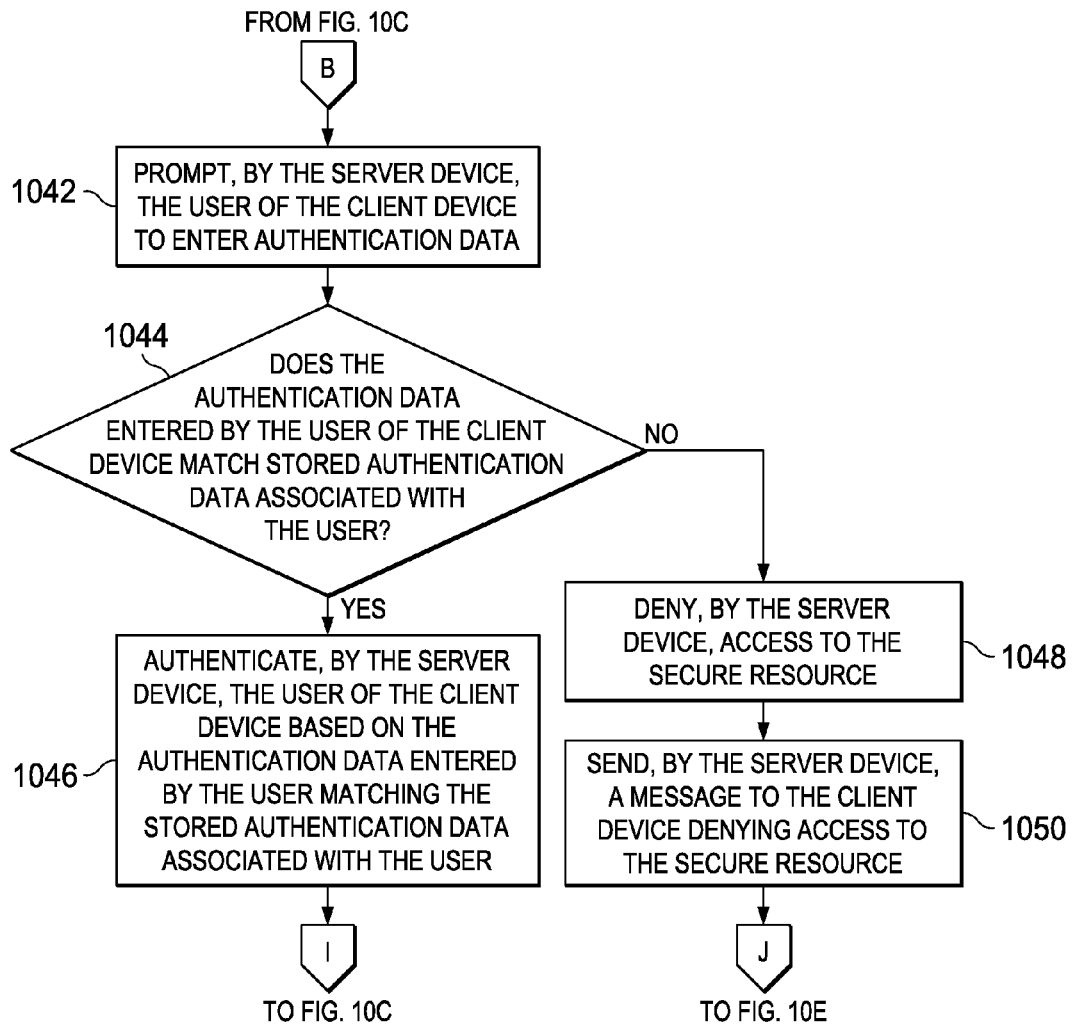

With reference now to FIG. 7, a diagram illustrating an example of an initial authentication request screen is depicted in accordance with an illustrative embodiment. Mobile client device 700 may be, for example, client 114 in FIG. 1. Mobile client device 700 includes display 702 and camera 704, such as display 314 and camera 316 in FIG. 3.

In this example, display 702 displays application 706, which is a calendar application. However, it should be noted that application 706 may be any application that a user of mobile client device 700 is currently using. When a user of a social authentication system, such as social authentication system 300 in FIG. 3, requests to be socially authenticated to access a secure resource, such as secure resource 308 in FIG. 3, by another user, such as already authenticated user 320 in FIG. 3, the social authentication system displays initial authentication request screen 708 within display 702.

Initial authentication request screen 708 asks the user of mobile client device 700 "Is this Adam?", for example. Video authentication data 710 corresponds to a facial image of the user requesting access to the secure resource. After viewing video authentication data 710, the user of mobile client device 700 may either enter input 712 "No, not Adam" or input 714 "Yes, Adam". Based on which input the user of mobile client device enters, the social authentication system will either grant or deny access to the requested secure resource.

With reference now to FIG. 8, a diagram illustrating an example of a continuous video authentication data feed is depicted in accordance with an illustrative embodiment. Client device 800 may be, for example, client 110 in FIG. 1. Client device 800 includes display 802, such as display 314 in FIG. 3.

In this example, display 802 displays web site 804, which is an online user's workspace. However, it should be noted that web site 804 may represent any web site or application that a user of client device 800 is currently working in. Also in this example, display 802 includes continuous video authentication data feeds 806. Continuous video authentication data feeds 806 may include a plurality of video authentication data feeds, such as, for example, video authentication data feeds 602-612 in FIG. 6. Continuous video authentication data feeds 806 display images of other users in a social authentication system, such as social authentication system 300 in FIG. 3, that are personally known by the user of client device 800.

In this example, the social authentication system does not detect a facial image of a user within continuous video authentication data feed 808. As a result, the social authentication system prompts the user of client device 800 to verify whether the user corresponding to continuous video authentication data feed 808 is present using verification request popup 810. In verification request popup 810, the user of client device 800 may either select "Not Paul", "Still Paul", or "Paul Stepped Out". In this example, the user of client device 800 selects "Paul Stepped Out". Consequently, the social authentication system may temporarily lock the secure resource that the user "Paul" was accessing.

Figure 9:
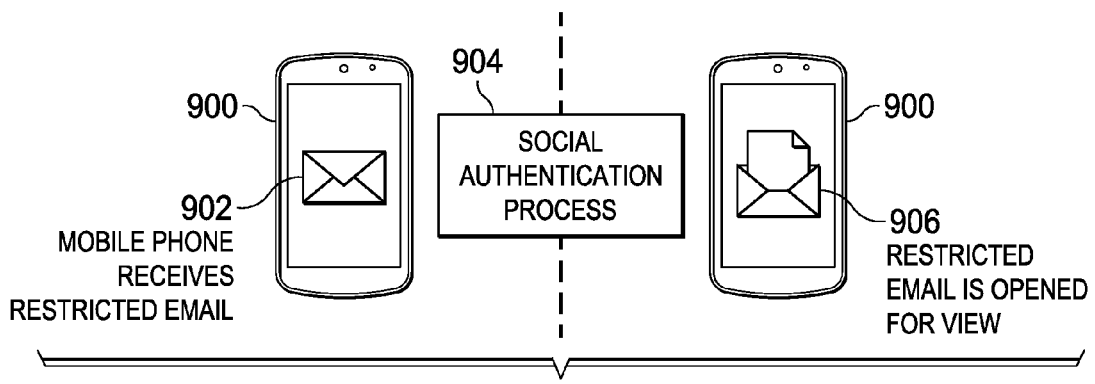
FIG. 9 is a diagram illustrating a specific example of using a social authentication process to access a restricted email in accordance with an illustrative embodiment.

With reference now to FIG. 9, a diagram illustrating a specific example of using a social authentication process to access a restricted email is depicted in accordance with an illustrative embodiment. Mobile phone 900 may be, for example, client device 304 in FIG. 3. In this example, a user of mobile phone 900 sees an indication that there is a new email in the user's inbox. It turns out that the new email is restricted email 902 and requires an extra level of security. In addition, a security policy associated with restricted email 902 states that the user may either input a valid password or verify the identity of the user through a mutual acquaintance or colleague. The user of mobile phone 900 may be, for example, unauthenticated user Z 510 in FIG. 5 and the mutual acquaintance may be, for example, authenticated user Y 508 in FIG. 5.

The user of mobile phone 900 selects authentication via social authentication process 904. Social authentication process 904 may be implemented in a social authentication system, such as social authentication system 300 in FIG. 3. Upon verification of the user's identity and authentication to access restricted email 902 by the mutual acquaintance, the social authentication system opens restricted email 902 for viewing at 906.

With reference now to FIGS. 10A-10F, a flowchart illustrating a process for user authentication is shown in accordance with an illustrative embodiment. The process shown in FIGS. 10A-10F may be implemented in a server device, such as, for example, server 104 in FIG. 1 or social authentication system server 302 in FIG. 3.

The process begins when the server device receives a request from a user of a client device to access a secure resource (step 1002). The user of the client device may be, for example, unauthenticated user 318 of client device 304 in FIG. 3. The secure resource may be, for example, secure resource 308 in FIG. 3.

After receiving the request to access the secure resource from the user of the client device in step 1002, the server device retrieves a list of designated users that are designated to authenticate the user of the client device to access the secure resource (step 1004). In addition, the server device monitors a social network associated with the user of the client device to determine whether any of the designated users in the list of designated users are currently logged in (step 1006). Further, the server device makes a determination as to whether any of the designated users in the list of designated users are currently logged in (step 1008).

If the server device determines that one or more of the designated users in the list of designated users are currently logged in, yes output of step 1008, then the server device makes a determination as to whether any of the currently logged in designated users have been authenticated to access the secure resource (step 1010). If the server device determines that none of the currently logged in designated users have been authenticated to access the secure resource, no output of step 1010, then the process proceeds to step 1042. If the server device determines that one or more of the currently logged in designated users have been authenticated to access the secure resource, yes output of step 1010, then the server device determines a status of each of the currently logged in designated users that have been authenticated to access the secure resource (step 1012).

Subsequently, the server device makes a determination as to whether a set of the currently logged in designated users that have been authenticated to access the secure resource is available to authenticate the user of the client device based on their status (step 1014). If the server device determines that a set of the currently logged in designated users that have been authenticated to access the secure resource is not available to authenticate the user of the client device based on their status, no output of step 1014, then the process proceeds to step 1042. If the server device determines that a set of the currently logged in designated users that have been authenticated to access the secure resource is available to authenticate the user of the client device based on their status, yes output of step 1014, then the server device establishes a video connection between the user of the client device and the set of currently logged in designated users that have been authenticated to access the secure resource (step 1016). The video connection may be, for example, video connection 322 in FIG. 3.

In addition, the server device sends an authentication request screen showing captured video authentication data corresponding to the user of the client device to the set of currently logged in designated users that have been authenticated to access the secure resource (step 1018). The authentication request screen may be, for example, initial authentication request screen 708 in FIG. 7. Afterward, the server device makes a determination as to whether the server device received an input via the authentication request screen authenticating the user of the client device from at least one designated user in the set of currently logged in designated users that have been authenticated to access the secure resource based on the captured video authentication data corresponding to the user (step 1020). The input may be, for example, input 714 in FIG. 7. If the server device determines that the server device did not receive an input via the authentication request screen authenticating the user of the client device from at least one designated user in the set of currently logged in designated users that have been authenticated to access the secure resource based on the captured video authentication data corresponding to the user, no output of step 1020, then the process proceeds to step 1042. If the server device determines that the server device did receive an input via the authentication request screen authenticating the user of the client device from at least one designated user in the set of currently logged in designated users that have been authenticated to access the secure resource based on the captured video authentication data corresponding to the user, yes output of step 1020, then the server device grants access to the secure resource (step 1022).

Further, the server device sends a continuous video authentication data feed showing currently captured video authentication data corresponding to the user of the client device to each designated user in the set of currently logged in designated users that have been authenticated to access the secure resource (step 1024). The continuous video authentication data feed may be, for example, continuous video authentication feed 808 in FIG. 8. Furthermore, the server device makes a determination as to whether the user of the client device is still accessing the secure resource (step 1026). If the server device determines that the user of the client device is not accessing the secure resource, no output of step 1026, then the process proceeds to step 1038. If the server device determines that the user of the client device is still accessing the secure resource, yes output of step 1026, then the server device makes a determination as to whether the server device is still receiving the currently captured video authentication data corresponding to the user of the client device (step 1028).

If the server device determines that the server device is still receiving the currently captured video authentication data corresponding to the user of the client device, yes output of step 1028, then the process returns to step 1026 where the server device determines whether the user is still accessing the secure resource. If the server device determines that the server device is not receiving the currently captured video authentication data corresponding to the user of the client device, no output of step 1028, then the server device prompts each designated user in the set of currently logged in designated users that have been authenticated to access the secure resource to verify a presence of the user of the client device in the continuous video authentication data feed (step 1030). The prompt may be, for example, verification request popup 810 in FIG. 8.

Subsequently, the server device makes a determination as to whether the server device received an input verifying the presence of the user of the client device in the continuous video authentication data feed from at least one designated user in the set of currently logged in designated users that have been authenticated to access the secure resource (step 1032). If the server device determines that the server device did receive an input verifying the presence of the user of the client device in the continuous video authentication data feed from at least one designated user in the set of currently logged in designated users that have been authenticated to access the secure resource, yes output of step 1032, then the process returns to step 1026 where the server device determines whether the user is still accessing the secure resource. If the server device determines that the server device did not receive an input verifying the presence of the user of the client device in the continuous video authentication data feed from at least one designated user in the set of currently logged in designated users that have been authenticated to access the secure resource, no output of step 1032, then the server device locks access to the secure resource (step 1034).

Further, the server device makes a determination as to whether the server device received newly captured video authentication data corresponding to the user of the client device within a predetermined threshold period of time (step 1036). The predetermined threshold period of time may be, for example, three minutes. However, it should be noted that the predetermined threshold period of time may be any increment to time.

If the server device determines that the server device did not receive newly captured video authentication data corresponding to the user of the client device within a predetermined threshold period of time, no output of step 1036, then the server device closes access to the secure resource (step 1038) and the process terminates thereafter. If the server device determines that the server device did receive newly captured video authentication data corresponding to the user of the client device within a predetermined threshold period of time, yes output of step 1036, then the server device unlocks access to the secure resource (step 1040). Thereafter, the process returns to step 1026 where the server device determines whether the user is still accessing the secure resource.

Returning again to step 1008, if the server device determines that one or more of the designated users in the list of designated users are not currently logged in, no output of step 1008, then the server device prompts the user of the client device to enter authentication data (step 1042). The authentication data may be, for example, a username/password combination and/or biometric data, associated with the user of the client device. Then, the server device makes a determination as to whether the authentication data entered by the user of the client device matches stored authentication data associated with the user (step 1044).

If the server device determines that the authentication data entered by the user of the client device does match the stored authentication data associated with the user, yes output of step 1044, then the server device authenticates the user of the client device based on the authentication data entered by the user matching the stored authentication data associated with the user (step 1046). Thereafter, the process returns to step 1022 where the server device grants access to the secure resource. If the server device determines that the authentication data entered by the user of the client device does not match the stored authentication data associated with the user, no output of step 1044, then the server device denies access to the secure resource (step 1048). In addition, the server device sends a message to the client device denying access to the secure resource (step 1050) and the process terminates thereafter.

Figure 11:
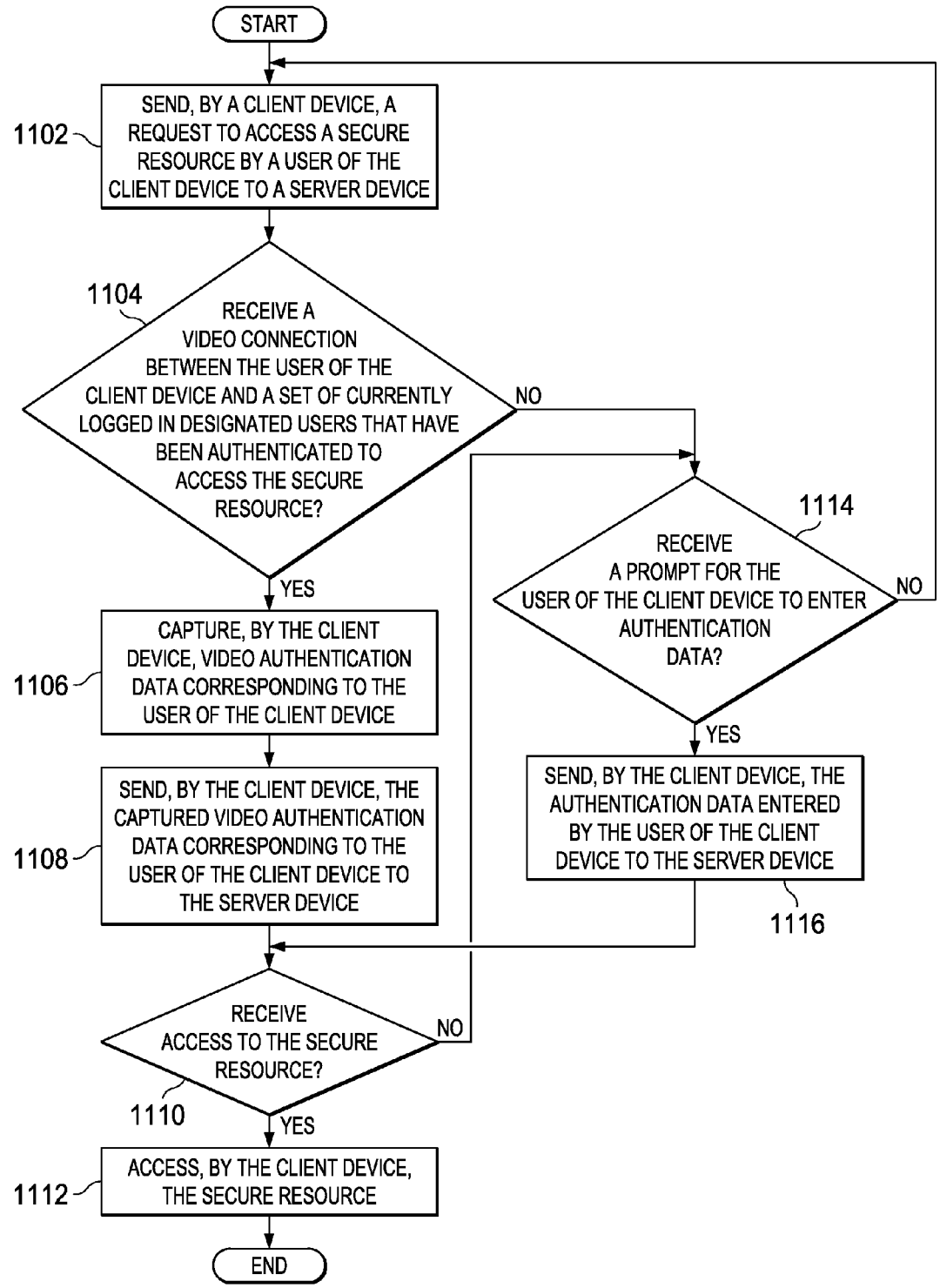
FIG. 11 is a flowchart illustrating a process for a client device in accordance with an illustrative embodiment.

With reference now to FIG. 11, a flowchart illustrating a process for a client device is shown in accordance with an illustrative embodiment. The process shown in FIG. 11 may be implemented in a client device, such as, for example, client device 304 in FIG. 3. In addition, the client device may be implemented in a data processing system, such as data processing system 200 in FIG. 2.

The process begins when the client device sends a request to access a secure resource by a user of the client device to a server device, such as server 302 in FIG. 3 (step 1102). The user of the client device may be, for example, unauthenticated user 318 in FIG. 3. The secure resource may be, for example, secure resource 308 in FIG. 3.

After sending the request to access a secure resource to a server device, the client device makes a determination as to whether the client device received a video connection between the user of the client device and a set of currently logged in designated users that have been authenticated to access the secure resource (step 1104). The video connection may be, for example, video connection 322 in FIG. 3. The set of currently logged in designated users that have been authenticated to access the secure resource may be, for example, already authenticated user 320 in FIG. 3.

If the client device determines that the client device did receive a video connection between the user of the client device and the set of currently logged in designated users that have been authenticated to access the secure resource, yes output of step 1104, then the client device captures video authentication data corresponding to the user of the client device (step 1106). The video authentication data may be, for example, video authentication data 710 in FIG. 7. In addition, the client device sends the captured video authentication data corresponding to the user of the client device to the server device (step 1108).

Then, the client device makes a determination as to whether the client device received access to the secure resource (step 1110). If the client device determines that the client device did not receive access to the secure resource, no output of step 1110, then the process proceeds to step 1114. If the client device determines that the client device did receive access to the secure resource, yes output of step 1110, then the client device accesses the secure resource (step 1112) and the process terminates thereafter.

Returning again to step 1104, if the client device determines that the client device did not receive a video connection between the user of the client device and the set of currently logged in designated users that have been authenticated to access the secure resource, no output of step 1104, then the client device makes a determination as to whether the client device received a prompt for the user of the client device to enter authentication data (step 1114). If the client device determines that the client device did not receive a prompt for the user of the client device to enter authentication data, no output of step 1114, then the process returns to step 1102 where the client device sends a request to access the secure resource. If the client device determines that the client device did receive a prompt for the user of the client device to enter authentication data, yes output of step 1114, then the client device sends the authentication data entered by the user of the client device to the server device (step 1116). Thereafter, the process returns to step 1110 where the client device determines whether access to the secure resource was received.

Thus, illustrative embodiments provide a method for authenticating a user of a client device to access a secure resource using video authentication data corresponding to the user that is viewed by a set of one or more designated users, which already have been authenticated to access the secure resource. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for user authentication, the method comprising:
   monitoring, by a data processing system, a social network associated with a user of a client device to determine whether a set of designated users are currently logged in and authenticated to access a secure resource;
   establishing, by the data processing system, a video connection between the user of the client device and the set of designated users that are currently logged in and authenticated to access the secure resource; and
   sending, by the data processing system, an authentication request screen showing captured video authentication data corresponding to the user of the client device to the set of designated users that are currently logged in and authenticated to access the secure resource.

2. The method of claim 1 further comprising:
   responsive to the data processing system receiving a request from the user of the client device to access the secure resource, retrieving, by the data processing system, a list of designated users that are designated to authenticate the user of the client device to access the secure resource.

3. The method of claim 1 further comprising:
   determining, by the data processing system, a status of each user in the set of designated users that are currently logged in and authenticated to access the secure resource.

4. The method of claim 1 further comprising:
   responsive to the data processing system receiving an input via the authentication request screen authenticating the user of the client device from at least one designated user in the set of designated users that are currently logged in and authenticated to access the secure resource based on the captured video authentication data corresponding to the user, granting, by the data processing system, access to the secure resource by the user of the client device.

5. The method of claim 1 further comprising:
   responsive to the data processing system granting access to the secure resource by the user of the client device, sending, by the data processing system, a continuous video authentication data feed showing currently captured video authentication data corresponding to the user of the client device to each designated user in the set of designated users that are currently logged in and authenticated to access the secure resource.

6. The method of claim 5 further comprising:
   responsive to the data processing system determining that the user of the client device is not present within the currently captured video authentication data corresponding to the user of the client device, prompting, by the data processing system, each designated user in the set of designated users that are currently logged in and authenticated to access the secure resource to verify a presence of the user of the client device in the continuous video authentication data feed.

7. The method of claim 6 further comprising:
responsive to the data processing system not receiving an input verifying the presence of the user of the client device in the continuous video authentication data feed from at least one designated user in the set of designated users that are currently logged in and authenticated to access the secure resource, locking, by the data processing system, access to the secure resource by the user of the client device.

8. The method of claim 1 further comprising:
responsive to the data processing system locking access to the secure resource by the user of the client device, determining, by the data processing system, whether newly captured video authentication data corresponding to the user of the client device was received within a predetermined threshold period of time; and
responsive to the data processing system determining that newly captured video authentication data corresponding to the user of the client device was received within the predetermined threshold period of time, unlocking, by the data processing system, access to the secure resource by the user of the client device.

9. The method of claim 8 further comprising:
responsive to the data processing system determining that newly captured video authentication data corresponding to the user of the client device was not received within the predetermined threshold period of time, closing, by the data processing system, access to the secure resource by the user of the client device.

10. The method of claim 1 further comprising:
responsive to the data processing system determining that no designated user in the social network of the user is currently logged in, prompting, by the data processing system, the user to enter authentication data.

11. The method of claim 1, wherein the client device is a mobile client device that includes an imaging device.

12. The method of claim 11, wherein mobile client device is one of a cellular telephone, a smart phone, a personal digital assistant, a gaming device, or a handheld computer with a wireless communication link to a network.

* * * * *